(12) United States Patent
Rolih

(10) Patent No.: US 10,416,840 B2
(45) Date of Patent: *Sep. 17, 2019

(54) MULTI-TAP FUNCTIONALITY FOR INTERACTIVE DYNAMIC PUSH NOTIFICATIONS AND OTHER CONTENT

(71) Applicant: Appelago Inc., New York, NY (US)

(72) Inventor: Peter Rolih, Cold Spring Harbor, NY (US)

(73) Assignee: Appelago Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/376,268

(22) Filed: Dec. 12, 2016

(65) Prior Publication Data

US 2017/0315701 A1 Nov. 2, 2017

Related U.S. Application Data

(60) Provisional application No. 62/265,892, filed on Dec. 10, 2015.

(51) Int. Cl.
| | |
|---|---|
| *G06F 3/0481* | (2013.01) |
| *G06F 3/0484* | (2013.01) |
| *G06T 13/80* | (2011.01) |
| *G06F 3/0482* | (2013.01) |
| *G06F 3/0489* | (2013.01) |

(52) U.S. Cl.
CPC ........ *G06F 3/04817* (2013.01); *G06F 3/0482* (2013.01); *G06F 3/0484* (2013.01); *G06F 3/04842* (2013.01); *G06F 3/04897* (2013.01); *G06T 13/80* (2013.01)

(58) Field of Classification Search
CPC ............ G06F 3/04817; G06F 3/04842; G06F 3/0482; G06F 3/0484; G06F 3/04897; G06T 13/80

See application file for complete search history.

(56) References Cited

U.S. PATENT DOCUMENTS

| | | | |
|---|---|---|---|
| 9,946,436 B2* | 4/2018 | Rolih | G06F 3/04817 |
| 2009/0146962 A1* | 6/2009 | Ahonen | G06F 1/1626 |
| | | | 345/173 |
| 2015/0001870 A1* | 1/2015 | Parcher | B60K 35/00 |
| | | | 296/1.07 |
| 2015/0019963 A1* | 1/2015 | Park | G06F 9/453 |
| | | | 715/708 |
| 2015/0042571 A1* | 2/2015 | Lombardi | G06F 3/01 |
| | | | 345/173 |
| 2015/0082162 A1* | 3/2015 | Cho | G06F 3/016 |
| | | | 715/702 |

OTHER PUBLICATIONS

Geoffrey Keating, "Designing meaningful notifications", Jan. 25, 2015, pp. 8 (Year: 2015).*

* cited by examiner

*Primary Examiner* — Chau T Nguyen
(74) *Attorney, Agent, or Firm* — Fish & Richardson P.C.

(57) ABSTRACT

A computer-implemented method for controlling an animated icon displayed on a display screen of a user device includes: providing, by at least one processor, an animated icon on the display screen of the user device to illustrate a notification content, determining, by the at least one processor, a number of times that the user has selected the animated icon on the display screen, and in response: performing, by the at least one processor, an action based on the number of times that the user has selected the animated icon.

15 Claims, 10 Drawing Sheets ered application Ser. No. 62/265,892, filed on Dec. 10, 2015. The
MULTI-TAP FUNCTIONALITY FOR INTERACTIVE DYNAMIC PUSH NOTIFICATIONS AND OTHER CONTENT

CROSS-REFERENCE TO RELATED APPLICATIONS

This application claims priority to U.S. Provisional patent application Ser. No. 62/265,892, filed on Dec. 10, 2015. The entire disclosure of the earlier application is incorporated herein by reference.

TECHNICAL FIELD

This disclosure relates to presenting interactive and dynamically changing information to users of electronic devices, such as smartphones and the like.

BACKGROUND

Electronic devices (e.g., cellular phones, tablet computers, smartphones, personal data assistants, smart watches, and virtual reality devices) can facilitate interactions between two or more different entities. For example, in some cases, a user can operate an electronic device in order to transmit information to others through a communications network. As another example, in some cases, a user can operate an electronic device in order to receive and review information from others through a communications network.

SUMMARY

Implementations for displaying interactive dynamic notifications on a user device are described herein.

In one aspect, for example, a computer-implemented method for controlling an animated icon displayed on a display screen of a user device is descried. The method includes: providing, by at least one processor, an animated icon on the display screen of the user device to illustrate a notification content; determining, by the at least one processor, a number of times that the user has selected the animated icon on the display screen, and in response: performing, by the at least one processor, an action based on the number of times that the user has selected the animated icon.

The foregoing and other aspects can each optionally include one or more of the following features, alone or in combination. Determining a number of times that the user has selected the animated icon can include determining that the user has selected the animated icon once, and in response: performing the action including opening a landing page that includes information related to the notification content. Determining a number of times that the user has selected the animated icon includes determining that the user has selected the animated icon twice, and in response: performing the action including pausing an animation of the animated icon. Determining a number of times that the user has selected the animated icon can include determining that the user has selected the animated icon three times, and in response: performing the action including displaying a notification setting to allow the user to customize notification content that the user wishes to receive through an animated icon.

Other aspects, features and advantages will be apparent from the following detailed description, the drawings and the claims.

DETAILED DESCRIPTION

Figure 1:
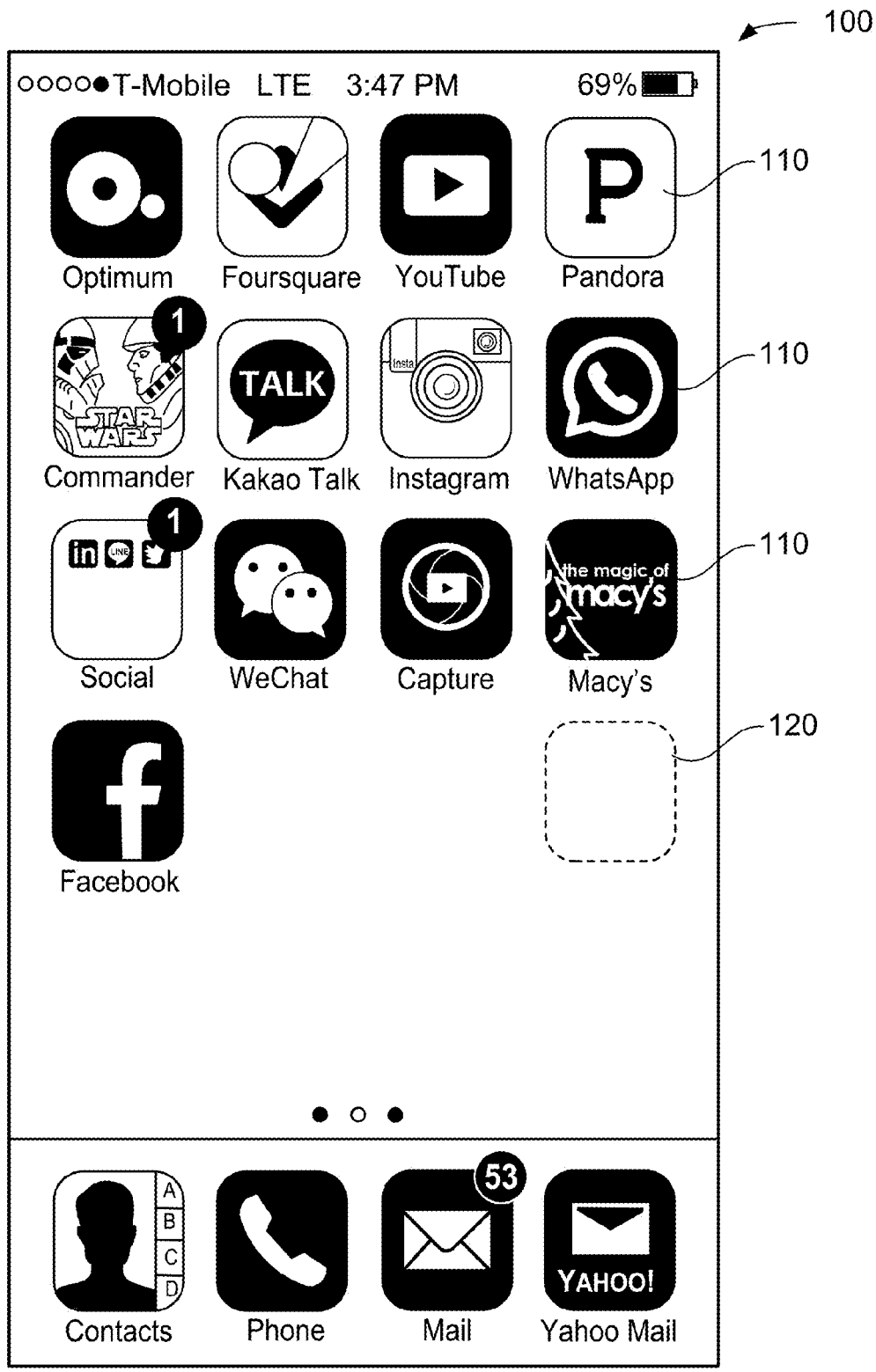
FIG. 1 depicts an example user interface.

Implementations for displaying interactive dynamic notifications on a user device are described herein. One or more implementations can be used for advertising goods or services, or relaying information relevant to an application, company, and/or user. The user can also interact with these notifications to request additional information, execute applications, transmit information to others, and/or perform any other function.

In an example implementation, a user device (e.g., a smartphone or a tablet computer) includes a display screen that is used to present information visually to a user. For example, the display screen presents a graphical user interface, upon which one or more applications are each visually represented using a graphical intelligent icon. In the following description, references to "icon" should be understood as applying to icons, apps, instant apps and/or widgets. References to "icon" can also refer to icons associated with Progressive Web Applications (PWAs). Specifically, a PWA is an app that can allow a user to visit an URL and immediately start using the app without actually installing the app in the user's device. A PWA can eliminate unnecessary steps for using an app such as downloading, installing, and opening the app.

The icons can be intelligent, and can be dynamically animated in order to display information to the user and/or receive information from the user. As one example, an icon representing a retail store can be animated to display promotions offered by the retail store. As another example, an icon representing a bank can be animated to display information regarding a user's relationship with the bank (e.g., balance or transaction information). As yet another example, an icon representing an auction site can be animated to display information regarding outcomes of a user's bids to purchase an item. As yet another example, an icon representing a dating service can be animated to display information regarding dating prospects. This animation can be "pushed" to the user device (e.g., from a server system) in order to provide the user with notifications in real-time or substantially real-time. Animations can be cached in case the phone is turned off, and when the phone is turned on, all cached animations can run sequentially as a commercial advertisement. In some instances, this animation can be displayed within a portion of an icon or across the entirety of an icon that is currently residing in a grid of icons on the display screen of the user device.

Icons can be dynamically animated in various ways, including modifying the icon's color, shape, and/or displayed image with or without audio. For example, an animated icon can blink, change color, and/or change shape.

As another example, an animated icon can depict the appearance, modification, and/or disappearance of text and objects displayed within the icon. As another example, an animated icon can display an animation, movie, audio and/or video within a portion of the icon or across the entirety of the icon. As another example, an animated icon can display a commercial or cartoon within a portion of the icon or across the entirety of the icon. In some cases, the animated icon can be hidden from view, then selectively revealed or displayed to the user. This can be useful, for example, to notify users of particular types of information (e.g., receipt of a message) while conserving space in the user interface when no information is being displayed.

In some instances, icons and their animations can be customized so that they display the desired information. For example, an icon can be customized by a user of the device, other users, advertisers, retailers, banks, or any other entity.

The user can also interact with the icon. For example, the user can select the icon in order to request additional information, execute applications, transmit information to others, load videos, open videos, and/or perform other operations. A user can interact with the icon in one or more different ways. For example, in some cases, a device can include a touch sensitive display screen that detects when the user touches or otherwise physically interacts with the display screen; to select an icon, the user can use his finger or hand to click, touch, or hold the display screen above the location where the icon appears. As another example, in some cases, a device can include an input device (e.g., a mouse, a trackpad, a keyboard, a joystick, a stylus, a dial, an eye-tracking device, or a gesture-tracking device) that allows a user to move or activate a selection element of the graphical user interface (e.g., a cursor or selection box) on the graphical display; to select an icon, the user can use the input device to move the selection element over the icon and confirm his selection. In some cases, when the user interacts with the icon, information regarding the user's interaction is transmitted to a third party (e.g., an administrator for the application, an advertiser, a retailer, or any other party). As an example, in some cases, information regarding the user installing the application (and accompanying icon), the time and nature of the user's interaction with the icon, and the user's location when he interacted with the icon can be transmitted to a third party for analysis. This information can be combined with other information (e.g., other usage data related to one or more users) in order to obtain more detailed information regarding each user's behavior.

An example user interface 100 is shown in FIG. 1. User interface 100 includes several icons 110, each of which represents a particular application that is available on an electronic device. A user can select any one of the icons (e.g., by touching a graphical representation of an icon on a touch-sensitive or pressure-sensitive display device or clicking on a graphical representation of an icon using an input device such as a mouse or a voice-command device) in order to execute the associated application. For example, a user can touch a graphical representation of an icon corresponding to a "Macy's" application in order to execute a "Macy's" application. In some cases, the user interface 100 can be referred to as a "launcher," a "home screen," a "spring board," or a "start screen."

Figure 2A:
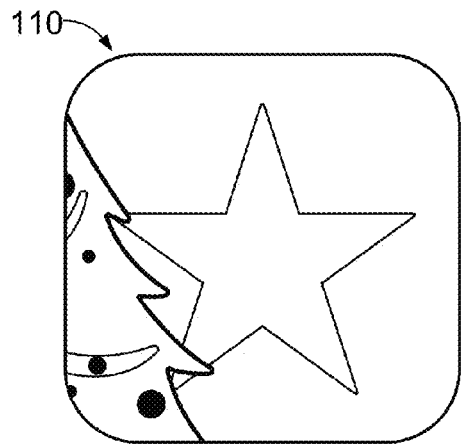
FIGS. 2A-F depict an example icon that is dynamically animated in order to display and receive information.
Figure 2B:
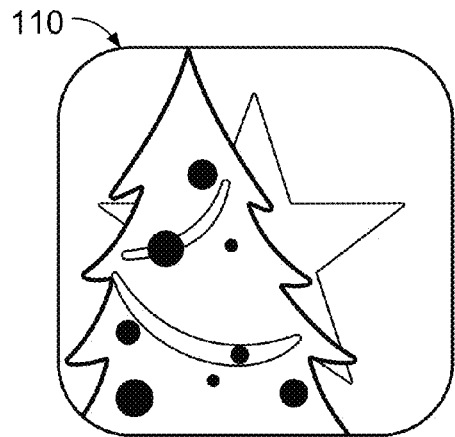
Figure 2C:
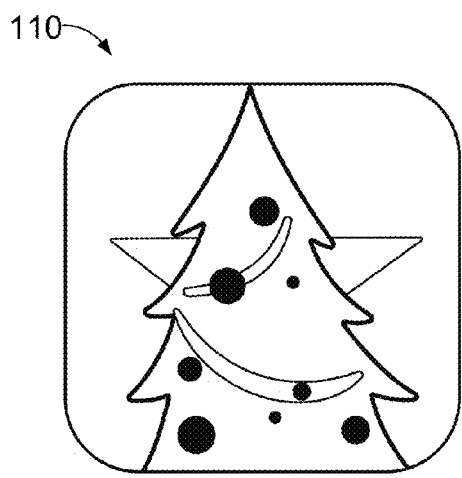
Figure 2D:
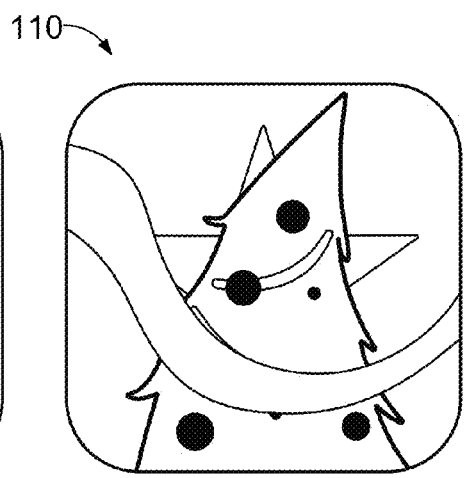
Figure 2E:
Figure 2F:

One or more of the icons 110 can be dynamically animated in order to display information to the user. In some cases, a dynamically animated icon can be presented as a series of static images (e.g., "frames") that visually differ from each other in some way. When viewed as a sequence, the images provide an appearance of motion or dynamic change. In some cases, the differences between sequential images can be relatively slight, such that the sequence of images provides an appearance of fluid motion. As an example, FIGS. 2A-F show, in sequence, the appearance of the icon 110 over a period of time. As shown in FIG. 2A, the icon 110 initially shows a star shape (e.g., representing a logo of an application or organization). As shown in FIGS. 2B-C, a tree shape is depicted entering the icon and covering the star shape. As shown in FIG. 2D-E, the tree shape is depicted leaving the icon, revealing a promotional message. As shown in FIG. 2F, the promotional message is maintained.

Although one example animation sequence is shown in FIGS. 2A-F, this is merely an illustrative example. In general, icons can be dynamically animated in various ways, including modifications to its color, shape, and displayed image. Further, animations can be played a single time (e.g., by playing a single animation sequence from the beginning to the end) and/or repeated (e.g., by playing the animation sequence multiple times, either with or without a period of rest in between).

In some cases, a dynamically animated icon can display a movie or video (e.g., a movie or video with or without accompanying sound) within a portion of the icon or across the entirety of the icon. For example, in some cases, an animated icon can display a live-action film (e.g., a film produced using one or more live actors, physical objects, and/or real-world locations). Thus, a live-action film can be presented within the icon in order to display information to the user. In some cases, the live-action film can be presented in a native video format (e.g., a video file), or it can be represented in an animated image format (e.g., an animated GIF) with or without audio.

In some cases, a dynamically animated icon can simultaneously depict several display elements (e.g., several different shapes, lines, objects, and/or patterns), where at least some of the display elements appear to be moving differently from others. For example, in some cases, a dynamically animated icon can depict a first display element that appears to be traveling in one direction, while simultaneously depicting a second display element that appears to be traveling in a different direction. As another example, in addition to the first and second display elements, the dynamically icon can simultaneously depict a third display element that appears to be changing shape. As another example, in addition to the first, second, and third display elements, the dynamically animated icon can simultaneously depict a fourth display element that appears to be changing size. In this manner, several different display elements can be displayed simultaneously on an animated icon, each of which can be moving differently from and/or independently of one another.

In some cases, a dynamically animated icon does not merely depict one or more static display elements (e.g., static images or text) and cycle between those static display elements using transition effects (e.g., a "sliding" effect, a "screen wipe" effect, or "flipping" effect). Instead, in some cases, a dynamically animated icon can depict one or more display elements that appear to be interacting with each other in a dynamic manner. As an example, in some cases, a dynamically animated icon can depict one or more articulating objects (e.g., cartoon representations of persons, animals, figures, or objects) and/or one or more objects that appear to be physically interacting with each other. Thus, in some cases, a dynamically animated icon does not merely display static images or text according to a transition effect, and instead provides the user with a more vibrant visual experience.

In some cases, an icon can be dynamically animated such that the icon is hidden from view (e.g., not displayed on a user interface), then selectively revealed or displayed to the user (e.g., graphically displayed on the user interface such that it becomes visible to a user). In some cases, when the icon is hidden, a portion of the user interface can be reserved for the icon, such that it is positioned at a particular location once it is revealed. For example, referring to FIG. 1, the user interface 100 can reserve a region 120 (denoted by a dotted box) for a hidden icon, such that other icons do not occupy the region 120. When the icon is revealed, it is displayed in the region 120.

Icons and their animations can be customized so that they display the desired information. For instance, in an example implementation, the icon 110 is typically static (e.g., not animated), such that it appears as a traditional still image on the graphical interface 100. However, when a particular event occurs with respect to an application (e.g., the availability of a promotional offer, the availability of a message from an organization associated with an application, a change in status of the application, or any other information), the icon 110 is animated to indicate that the particular event has occurred. This can have the effect of attracting the user's attention, and notifying the user that the event has occurred. The user can then select the icon to learn more information regarding the event.

In some cases, an icon 110 can be dynamically animated to show promotional offers. For example, in some cases, an icon 110 can represent a shopping application (e.g., an application related to a particular retailer). When a promotion is made available to the user for that application (e.g., a promotion offered by the retailer), the icon 110 representing the application can be animated to indicate the availability of that promotion. Once the promotion is no longer available, the animation can cease or the icon 110 can disappear.

In some cases, an icon 110 can be dynamically animated to show the receipt of messages from a messaging service (e.g., an e-mail, an instant message, a social media message). For example, in some cases, an icon 110 can represent a messaging application (e.g., a client application that provides a user with access to a messaging system or social media platform). When a message is transmitted to the user of that application, the icon 110 representing the application can be animated to indicate receipt of that message. In some cases, the message can be animated to show content from the message. For example, the icon can be animated to show text, images, movies, videos from the message. In some cases, for example when the icon includes a movie, video, or audio clip having an audio portion, the audio portion can be played as the icon is animated. Once the message has been read or discarded, the animation can cease or the icon 110 can disappear.

In some cases, an icon 110 can be dynamically animated to show the status of a financial transaction or the status of a financial account. For example, in some cases, an icon 110 can represent a banking or brokerage application (e.g., an application that provides a user with access to a financial account at a financial institution). When a particular financial transaction has been conducted (e.g., a transfer of money or assets to or from the user's financial account), the icon 110 representing the application can be animated to indicate that the financial transaction has been conducted. For instance, the icon 110 can be animated to indicate when a purchase of a stock has been successfully completed, or to verify the purchase of any other security of asset. Further, the icon can be animated to show the status of the user's financial account (e.g., the user's account balance). The user can stop the animation (e.g., by interacting with the icon) once he has received the information. In some cases, sensitive information (e.g., account balances or payment confirmations) can be hidden unless the user authenticates his identity (e.g., by providing a password, a biometric input such as a fingerprint, voice command or any other credential).

Although example implementations are described above, these are merely illustrative examples. In practice, animations can be used to indicate other types of information, statuses, or events directly on a user interface (e.g., on an application launcher interface, such as a "launcher," a "home screen," a "spring board," or a "start screen").

In some cases, an application can respond in one, two, three, or more different ways, depending on whether the application's icon was animated when the user selected it. For example, in some cases, when the user selects the icon while the icon is static (e.g., not animated), the device executes the application associated with the icon and presents the user with a default application interface (e.g., a "general" user interface). However, when the user selects the icon while it is animated a first way, the device executes the application and presents the user with a secondary application interface (e.g., a "promotional" interface that provides more information regarding a particular promotion). Further, when the user selects the icon while it is animated a second way, the device executes the application and presents the user with a tertiary application interface (e.g., a "notification" interface that provides more information regarding a particular notification or alert). In this manner, the application can be executed differently, depending on whether the icon is animated at the time of selection.

In some cases, the user can interact with the icon in one two or more different ways in order to perform different functions. For example, in some cases, the user can select an icon once (e.g., by tapping a touch sensitive display) to perform a first action (e.g., execute an application according to a default behavior), select the icon twice (e.g., by double tapping) to perform a second action (e.g., execute an application in an alternative interface), and select the icon three times (e.g., by triple tapping) to perform a second action (e.g., execute an application in another alternative interface). In some cases, the user also can perform gestures with respect to the icon (e.g., using his finger, stylus, or hand to draw a line, a circle, a check mark, or an "X" mark on the device's display screen above the location where the icon appears or initiate a response using a voice command) in order to cause the application to perform different actions. In some cases, the user can vary the length of time in which he performs a gesture (e.g., pressing the device's display screen for a length of time vs. tapping the device's display screen for a shorter period of time) in order to perform different functions. In some cases, a user can define custom gestures, and associate those gestures with particular functions.

Figure 3A:
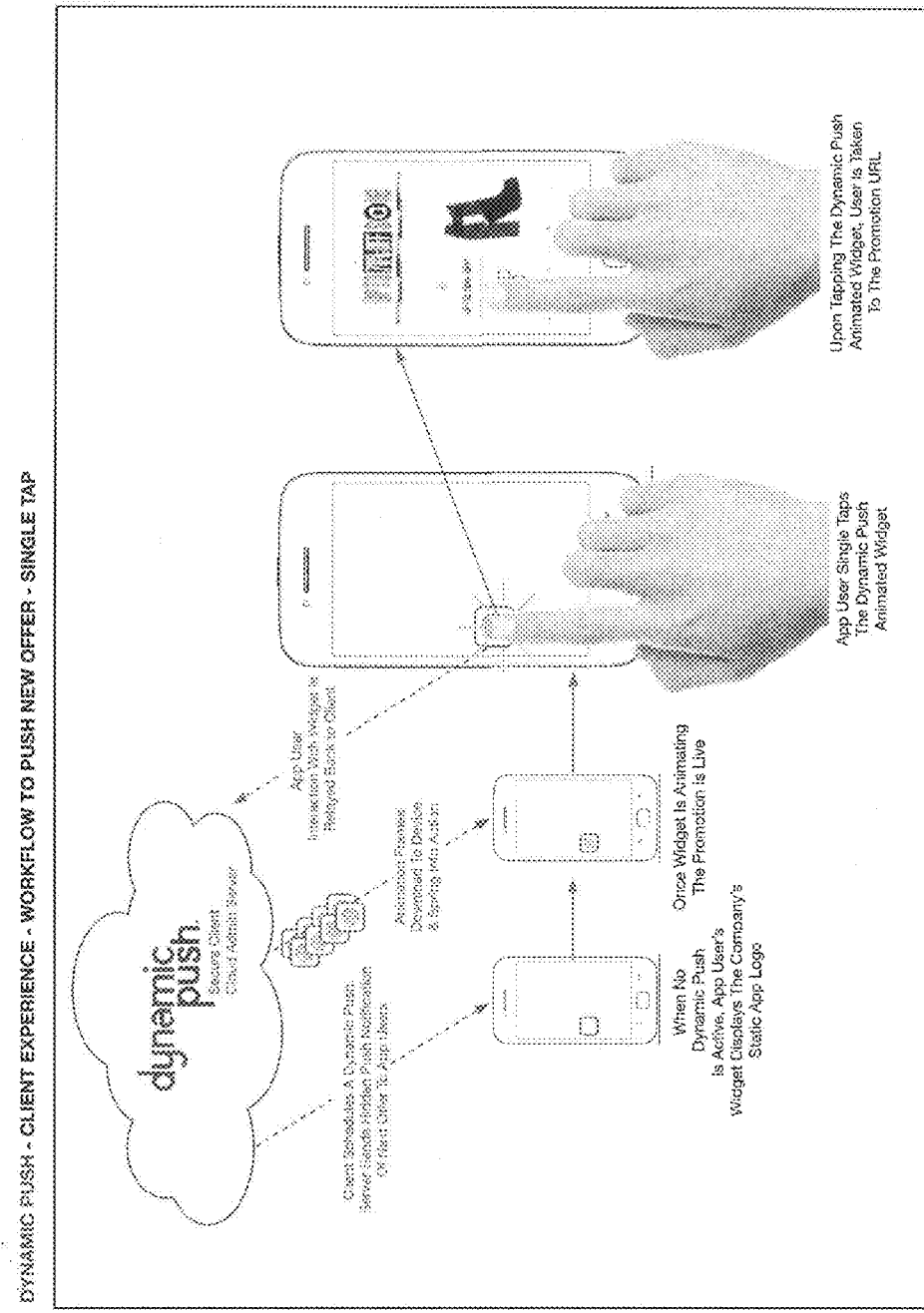
FIGS. 3A, 3B and 3C illustrate examples multi-tap functionality for a dynamic push animated icon.
Figure 3B:
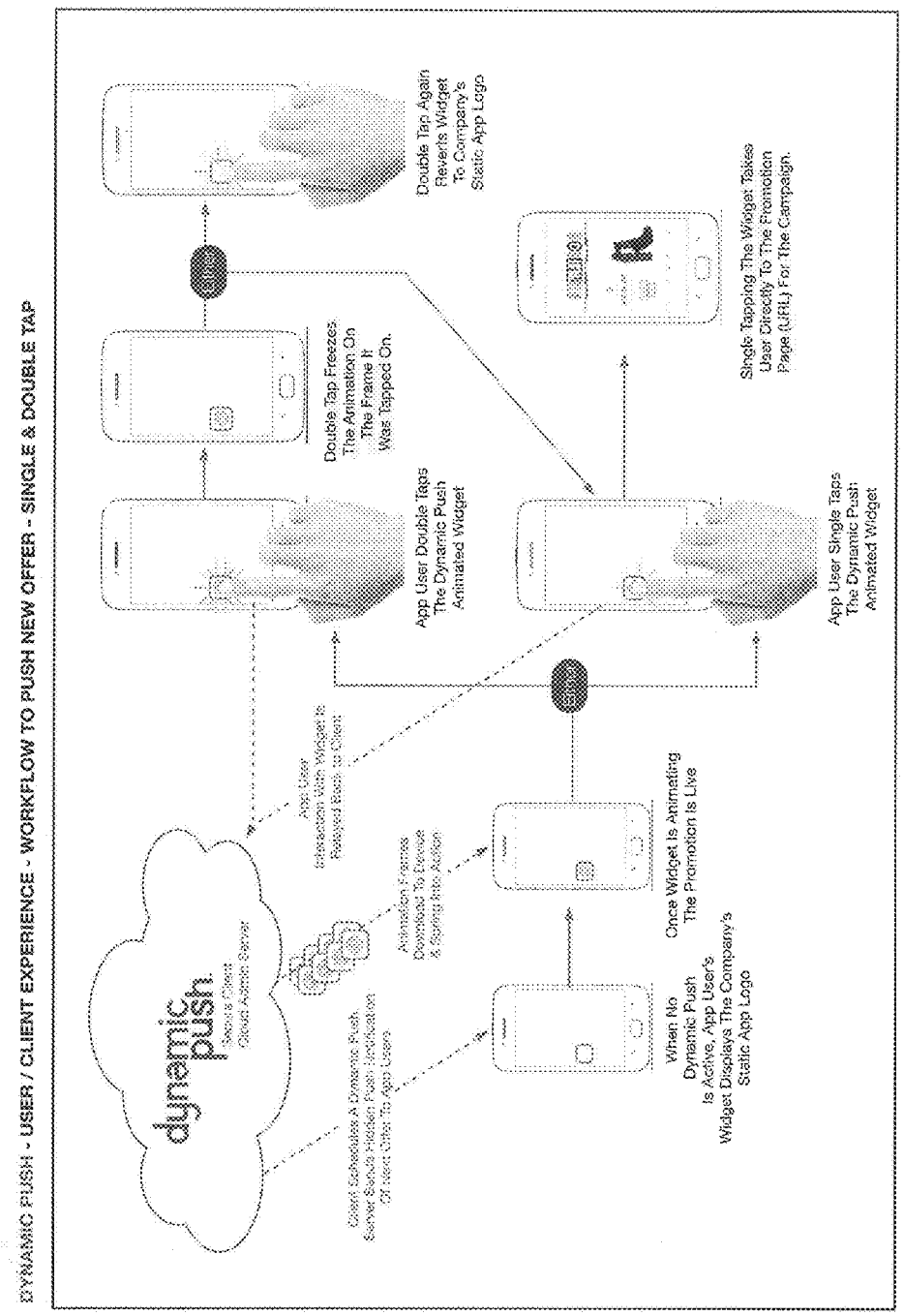
Figure 3C:
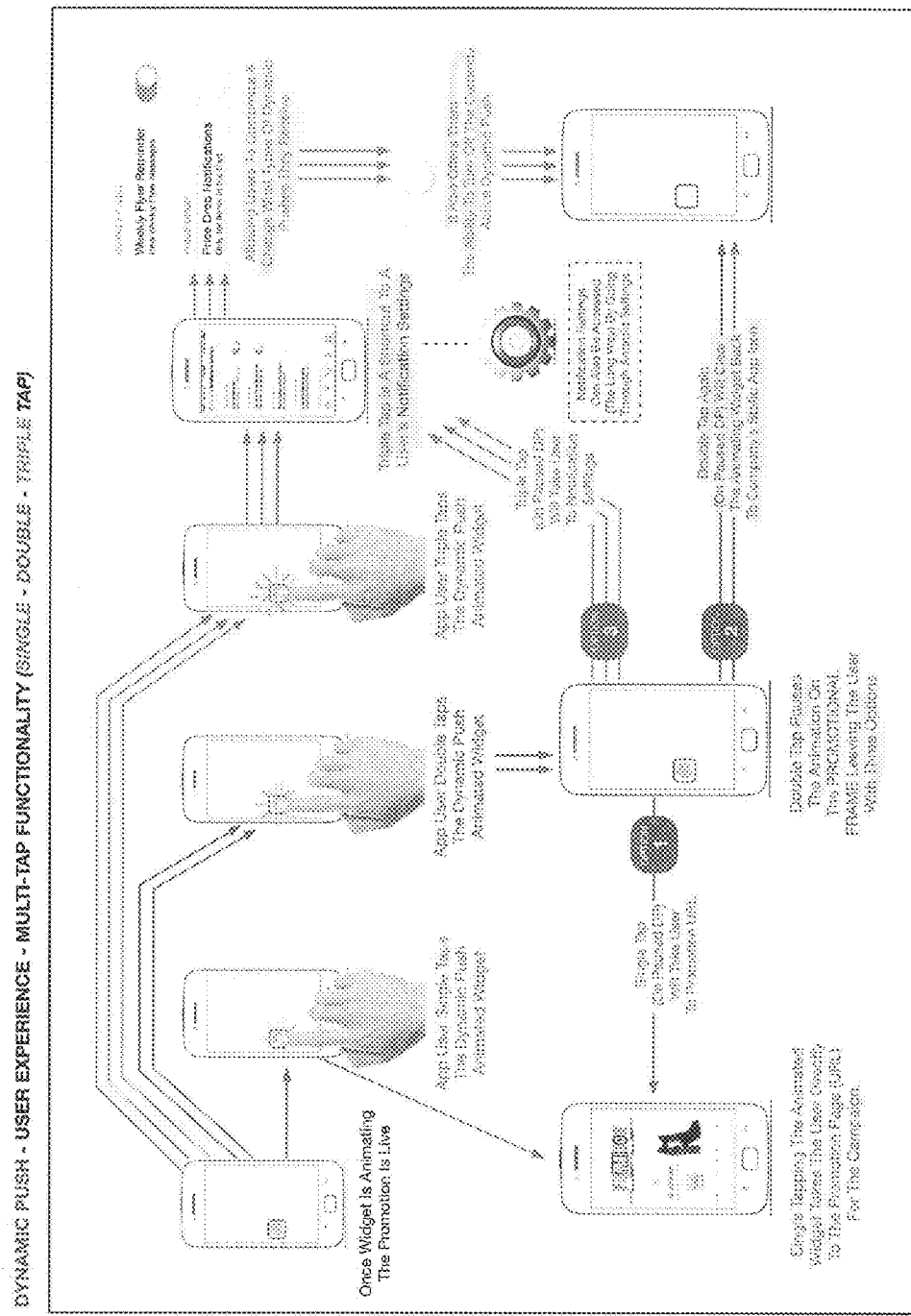

FIGS. 3A, 3B and 3C illustrate examples of the multi-tap functionality. In particular, FIG. 3A illustrates an example of single tap functionality; FIG. 3B illustrates an example of two-tap functionality; and FIG. 3C illustrates an example of three-tap functionality. For example, by single tapping the dynamic push animated icon appearing on the display screen of the mobile device, the application links the user device directly to the promotion page (URL) for the campaign. Double tapping the dynamic push animated icon appearing on the display screen of the mobile device pauses the animation. Double tapping again (i.e., on the paused dynamic push icon) clears the animating widget back to the company's static application icon. Triple tapping the dynamic push animated icon appearing on the display screen of the mobile device serves as a shortcut to the user's notification settings, which allow the user to customize and change the types of dynamic content the user wishes to receive. The settings also can provide the user with the ability to turn off the currently active dynamic push icon. The foregoing multi-tap (or multi-click) operations also can be used for other types of content such as programmable videos.

Icons and their animations can be customized so that they display the desired information. For example, an icon can be customized by a user of the device, other users, advertisers, retailers, banks, or any other entity. In some cases, icon animations can be customized by the entity that is associated with an application. For example, if an icon represents an application provided by retailer, the retailer (or its agent) can customize the animation in order to display the desired information. As another example, if an icon represents an application provided by a bank, the bank (or its agent) can customize the animation in order to display the desired information.

In some cases, icon animation can be selectively controlled for each of multiple sub-sets of users. For example, in some cases, even though several users each may have a particular application installed, different sub-sets of users each may see different icon animations. In some cases, users can be divided into different sub-sets based on demographic information. This can be particularly useful, for example, in providing targeted advertising, such that a particular promotion is presented to particular types of users who may find the promotion useful, while not presenting the promotion to other users who might not find the promotion useful. In some cases, a user's demographic information can be determined based on a user's input. For example, in some implementations, a user can input his gender, age, location, ethnicity, interests, income, family information, and/or any other demographic information into an application associated with the animated icon. The collection or use of such information may, in some situations, be subject to privacy laws or regulations.

In some cases, icon animations can be customized by a user of a device. For example, the user can input his own animations or select particular animations from among a collection of pre-defined animations, such that icons are animated according to the user's preferences. This can be useful, for example, as it allows the user to select animations that are more aesthetically pleasing and/or more useful to that user.

As another example, the user can associate particular animations with particular criteria. For example, the user can specify that an icon should animate a certain way in order to display one type of information (e.g., a promotional offer from one merchant), and that the icon should animate a different way in order to display another type of information (e.g., a message from another user).

As another example, the user can specify the conditions under which an icon will animate. For example, the user can select particular merchants from which he wishes to receive promotional offers. Upon receipt of a promotional offer from one of the selected merchants, an icon can animate to present the promotion to the user. In some cases, a user can be presented with a list or grid of several different merchants, and a user can select one or more of these merchants to indicate particular merchants from which he wishes to receive promotional offers, or deselect one or more of these merchants to indicate particular merchants from which he no longer wishes to receive promotional offers.

As another example, the user can control animations (e.g., by selectively starting or stopping animations). This can be useful, for example, as it allows the user to cease icon animations that he is no longer interested in viewing, and initiate and/or maintain animations that he is interested in viewing. As an example, in some cases, an icon might be animated to alert the user to a promotion, and the user can cease the animation after he is no longer interested in the promotion. In some cases, the user can control animations by inputting commands, for example by selecting the icon (e.g., by tapping the device's display screen above the location where the icon appears) or performing a gesture with respect to the icon (e.g., by drawing a line on the device's display screen above the location where the icon appears).

In some cases, a user can specify which icons he wishes to be animated. For example, the user can specify that a first sub-set of icons should be animated in order to display particular types of information, while a second sub-set of icons should remain static. This can be useful, for example, as it allows the user to specify that icons pertaining to particular applications of interest should be animated, while specifying that icons pertaining to other applications (e.g., applications in which he has less interested) are not animated. In some implementations, the user can specify each of these icons manually. In some implementations, icons can be specified at least in part, based on automated processes that identify icons that may be of interest to the user.

In some cases, icon animations can be generated or customized by a third party that is not directly related to the user or entity that associated with the application. For example, in some cases, icons can be animated by a third party advertiser that maintains promotional offers or advertising campaigns on behalf of a retailer, but otherwise is not directly related to the retailer. In some cases, the advertiser can customize the icon animations on behalf of one or more entities (e.g., one or more retailer) as a service to those entities.

Icons provided by third-parties can replace the existing icon of an application, or can be presented in conjunction with the existing icon of the application. For example, in some cases, an animated icon provided by an advertiser can replace the existing icon of a retailer's application, such that the user accesses the application through the icon provided by the advertiser. This can be useful, for example, as it allows the advertiser and retailer to maintain a single unified presence with respect to the user. As another example, in some cases, an animated icon provided by an advertiser can be displayed in addition to the existing icon of the retailer's application, such that the user can access the application through either icon. This can be useful, for example, as it allows the retailer and the advertiser to maintain distinct presences with respect to the user. In practice, either arrangement can be used, depending on the relationship between the party maintaining the application and the third-party providing the animated icon.

In some cases, animations can be time sensitive, such that they occur during particular periods of time, and do not occur during other periods of time. This can be beneficial, for example, in presenting time sensitive information or information that may be of diminished usefulness outside of a particular range of time. For example, animations can be time sensitive in order to provide information regarding limited promotions or time-sensitive messages. In some cases, icon animations can be scheduled ahead of time (e.g., by an administrator) such that they are initiated at a particular point in time in the future. This allows administrators to coordinate the release of information (e.g., to coordinate the release of information as a part of a larger advertising campaign, or to coordinate the release of information upon the planned release of a product or service).

Figure 4A:
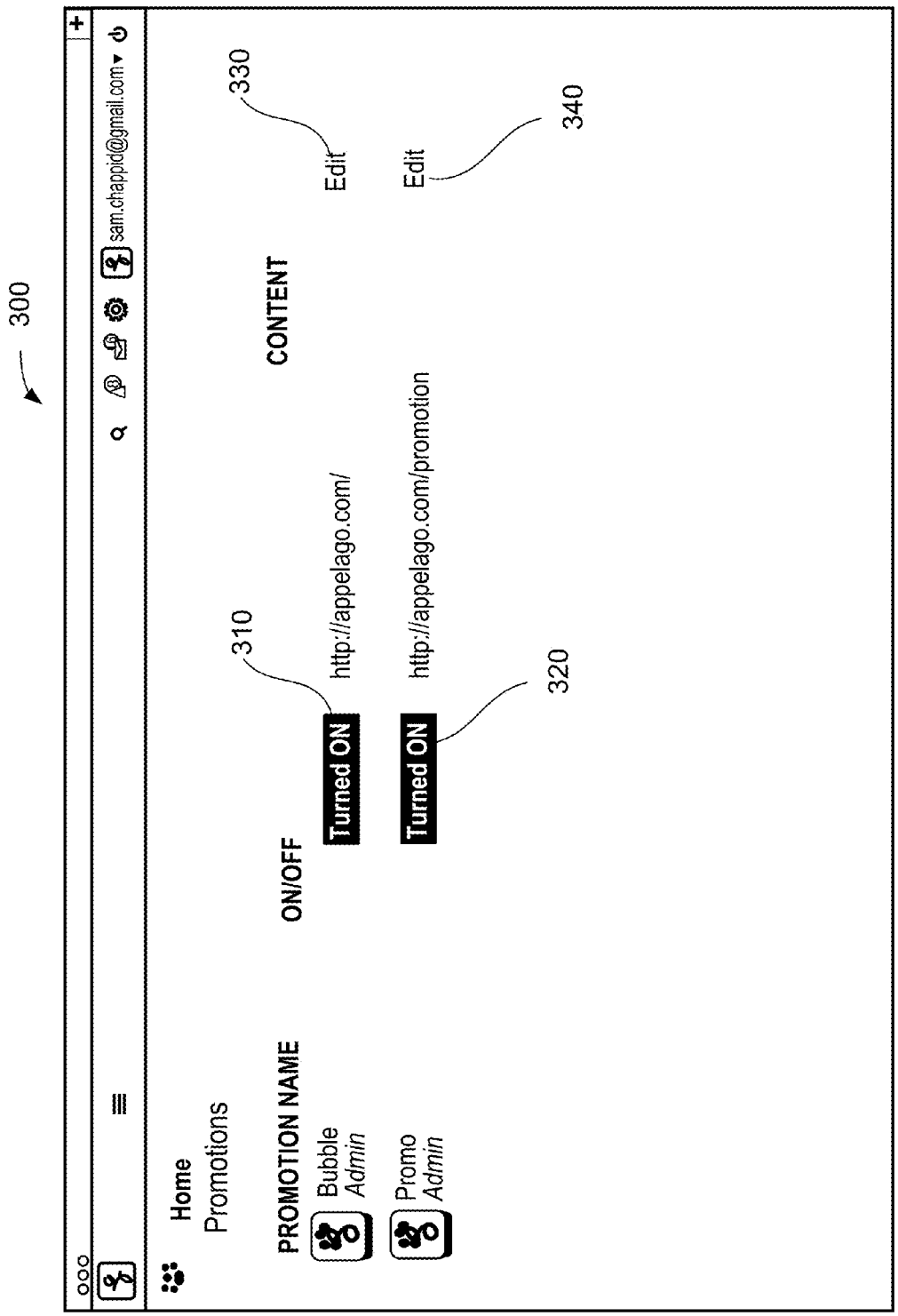
FIG. 4A depicts an example administrator interface.

In some instances, the animation of an icon can be controlled through a user interface (e.g., an administrator interface). An example administrator interface 300 is shown in FIG. 4A. A user (e.g., an administrator) can selectively enable or disable animations on one or more user devices (e.g., devices operated by one or more customers, clients, or other users) by selecting an appropriate option on the administration interface 300. For example, an administrator can toggle a first animation by selecting an interface element 310, and toggle a second animation by selecting an interface element 320. In response, the first animation and second animation are selectively enabled or disabled on one or more customers' devices. In some cases, an administrator associated with an advertiser can control icon animations on several customers' devices in order to display promotional information selectively to those customers. An administrator also can edit the content shown by the icon animations selectively. For example, the administrator can edit the content of the first animation by select an interface element 330, and can edit the content of the second animation by select an interface element 340. In response, the administrator interface 300 can present the administrator with an appropriate interface (e.g., an animation editing interface) such that the administrator can make changes to the animation.

Figure 4B:
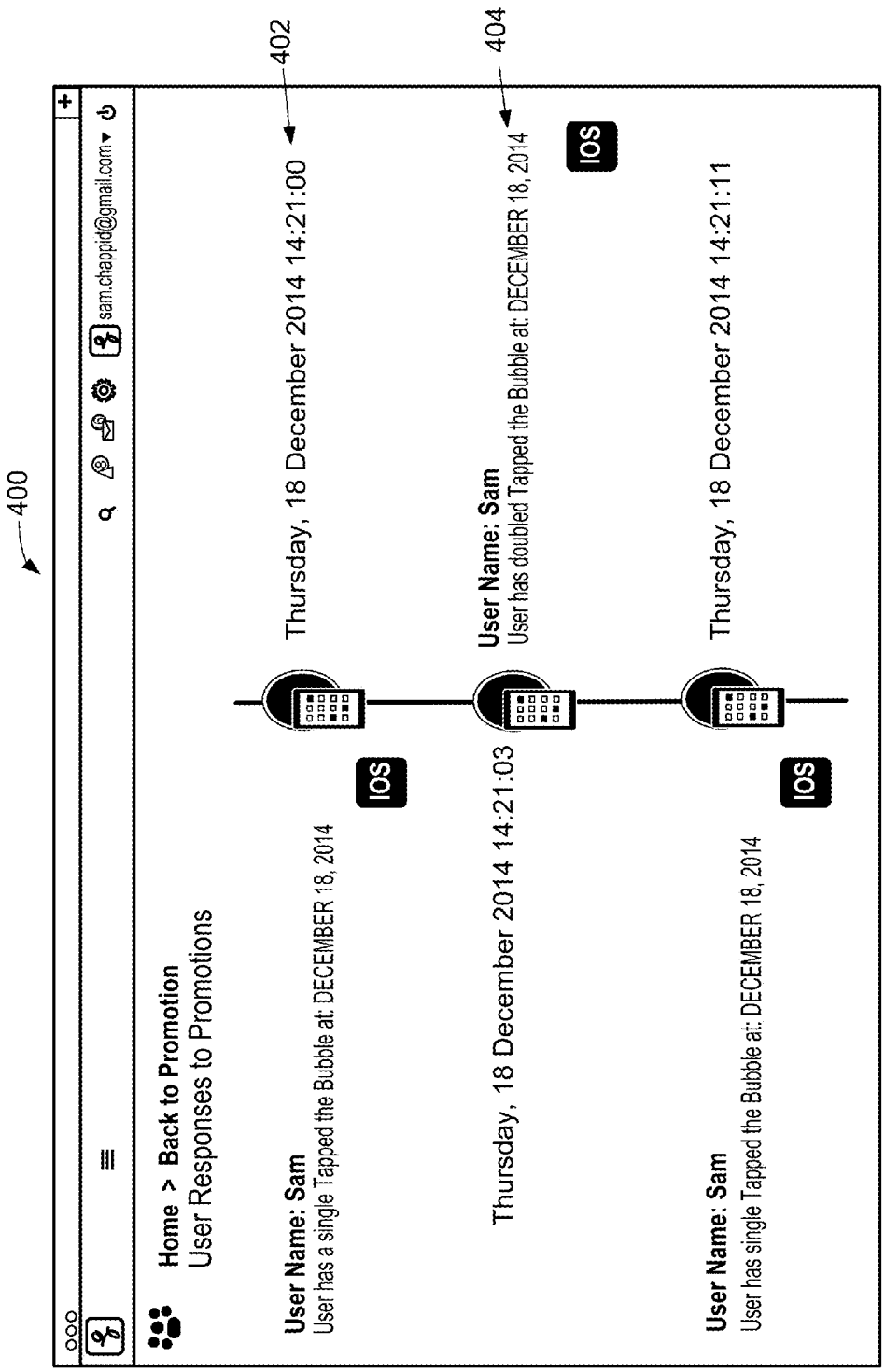
FIG. 4B depicts an example analytics interface.

In some cases, when the user (e.g., a customer) interacts with an icon, information regarding the user's interaction is transmitted to a third party (e.g., an administrator for the application, an advertiser, a retailer, or any other party). This information can be viewed using a user interface (e.g., an analytics interface). An example analytics interface 400 is shown in FIG. 4B. A user (e.g., an administrator) can use the analytics interface 400 to view how another user (e.g., a customer) interacts with the icon. For example, the administrator can view when the customer has single tapped the icon (e.g., as shown by event 402), and when the customer has double tapped an icon (e.g., as shown by event 404). In some cases, the analytics interface 400 can show information regarding a single user or several users (e.g., a single customer or several customers). In some cases, information shown in analytics interface 400 can be filtered in order to show information selectively according to one or more criteria (e.g., information pertaining to a particular user or group of users).

Figure 5:
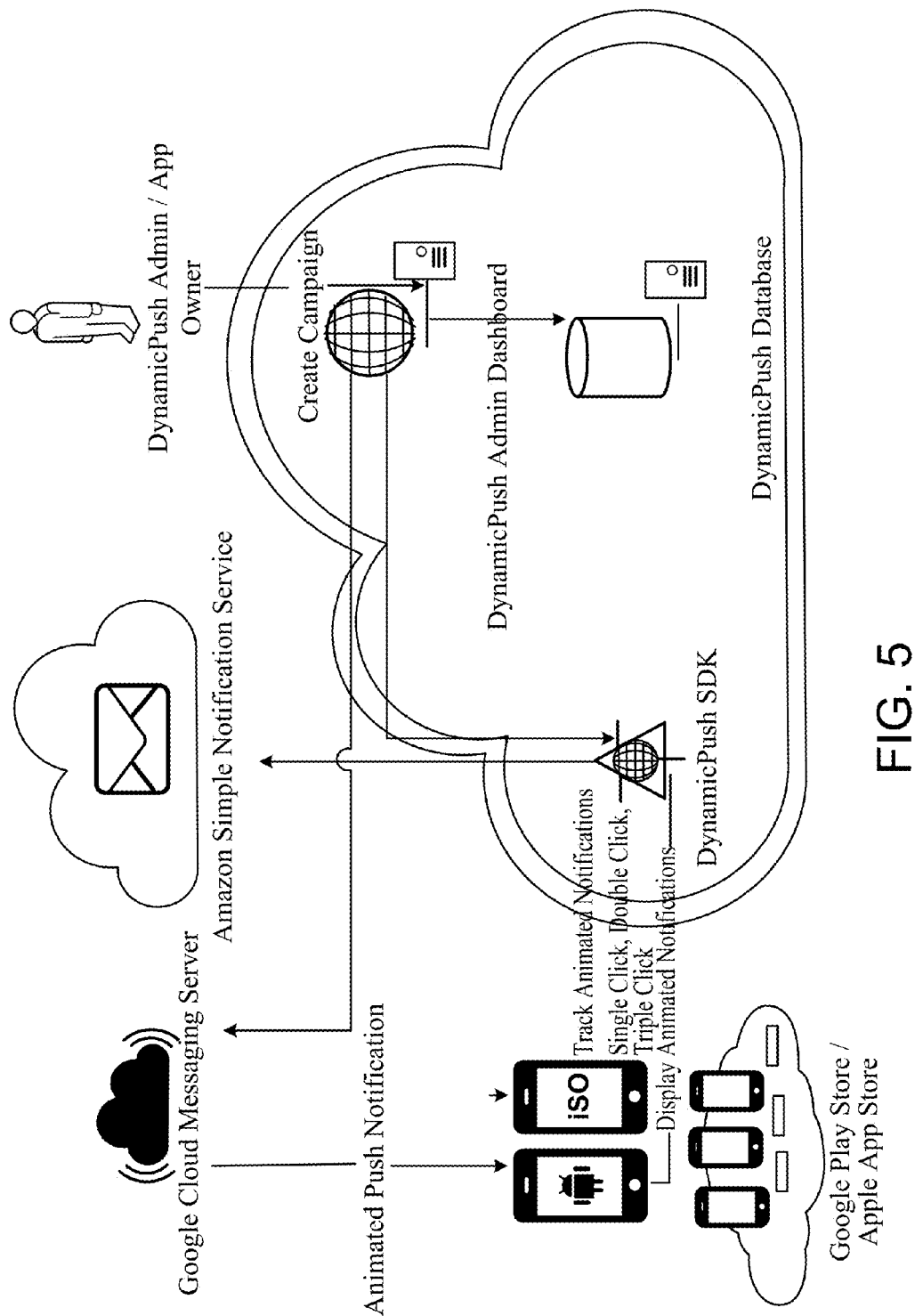
FIG. 5 is a diagram of an example system architecture for implementing interactive dynamic push notifications and campaigns.
Figure 6:
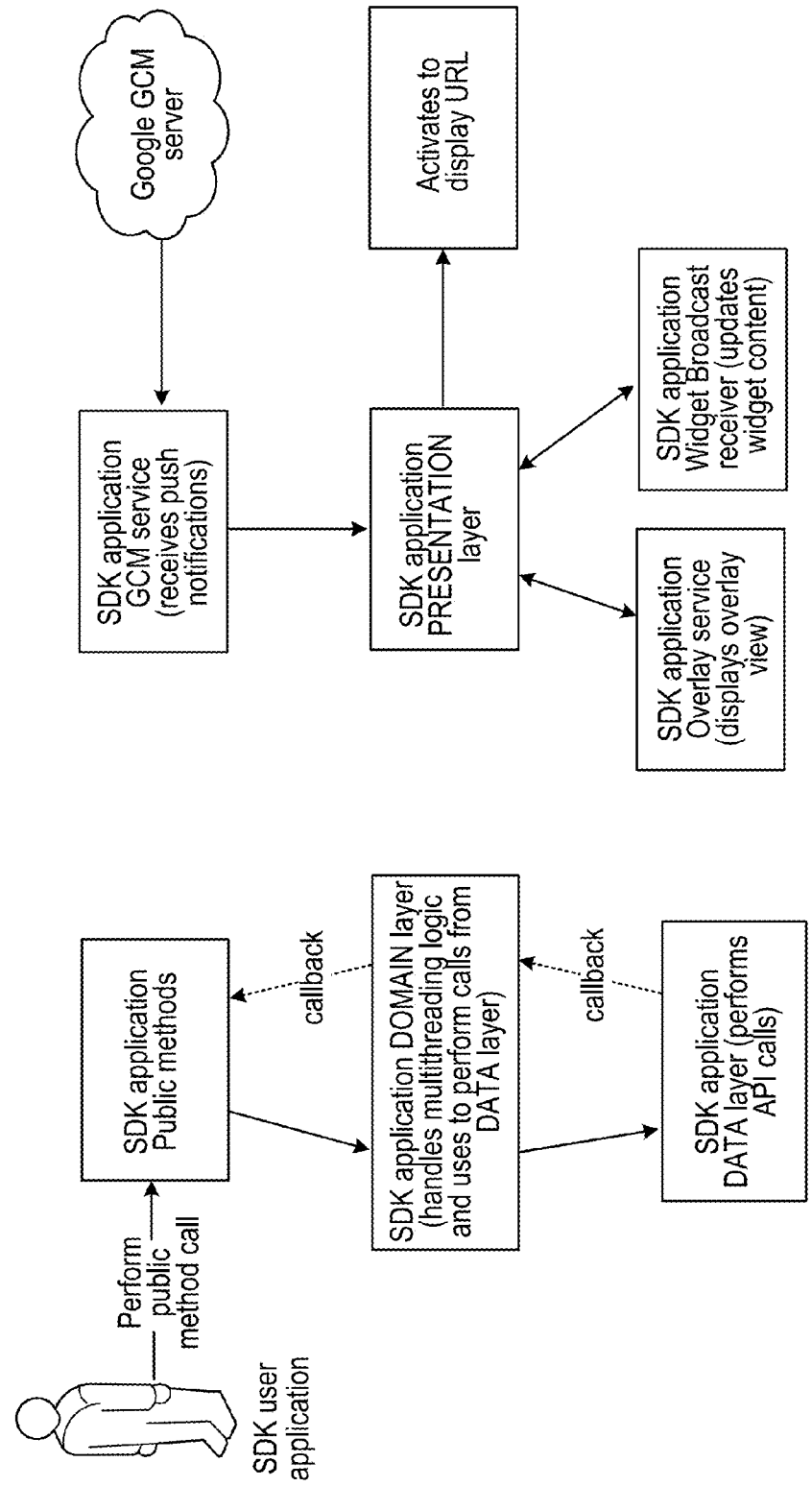
FIG. 6 is a component view of the architecture.
Figure 7:
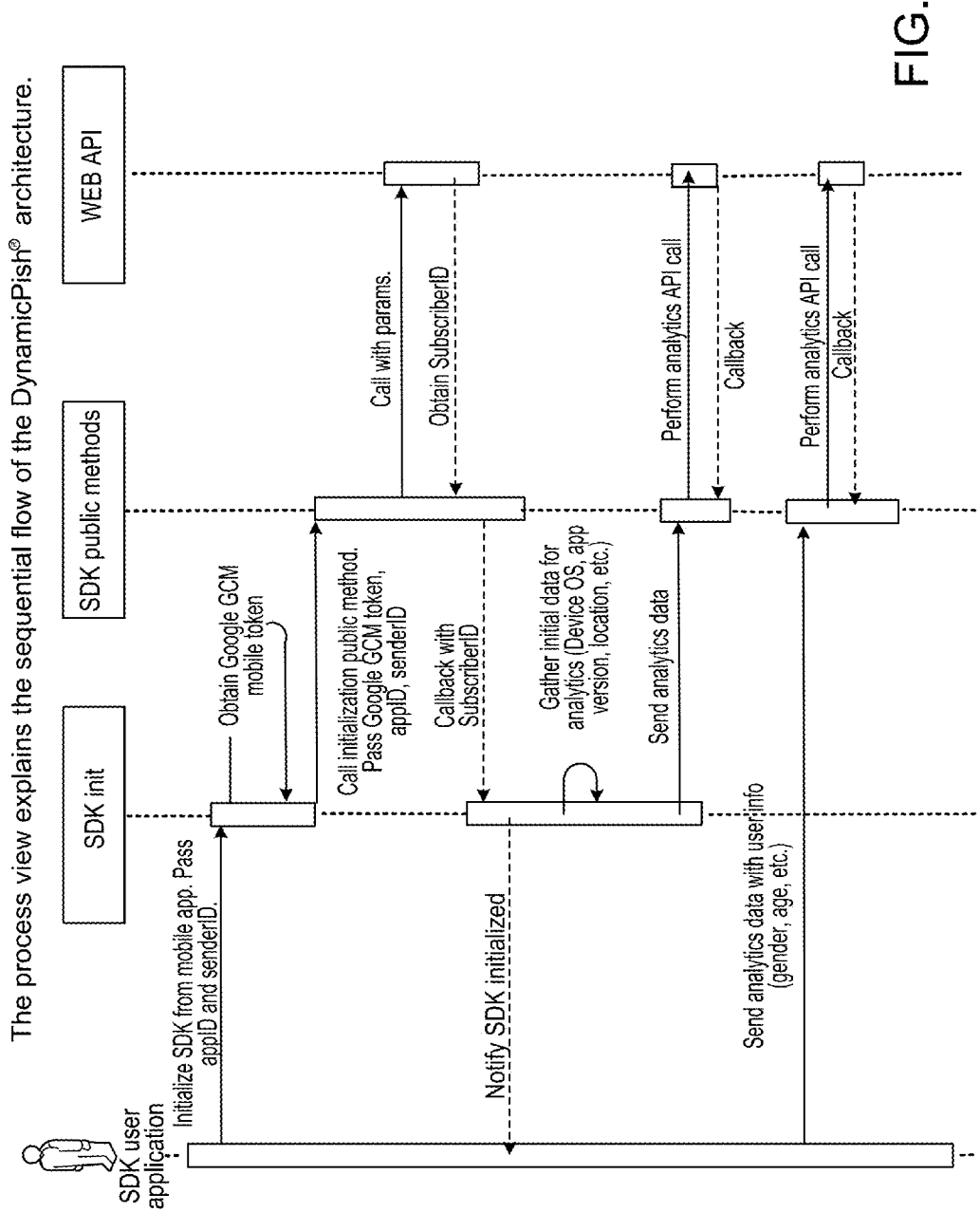
FIG. 7 illustrates an example of a sequential flow for the push notification architecture.

FIG. 5 illustrates an example of the logical representation of the architecture for a system operable to implement the push campaigns. FIG. 6 is a component view of the architecture. FIG. 7 illustrates an example of the sequential flow for the architecture. In the illustrated example, Dynamic-Push® SDK with Admin Dashboard is an animated push notification service product named "DynamicPush®." Architecture is designed and developed to support both Android and iOS platforms in the form of SDKs. For Android platforms, DynamicPush® can be an application without a Launcher icon and can display notifications on top of all user content and apps. For iOS platforms, Dynamic-Push® can use iOS expanded detail view with 3D Touch (iOS versions 10 and up) that displays rich content, such as an animation or a video; or an applet, such as a map or a calendar. with or without audio. The admin web application can manage the DynamicPush® Animated Push Notifications, for example as a campaigns via Google Cloud Messaging Systems and Amazon Simple Notification Service (SNS) as Pub-sub Service for Mobile and Enterprise Messaging and facilitation of analytics tracked by Dynamic-Push® with different attributes of Mobile App Users (User Attributes, User Activities, User locations, Retarget Audiences and Marketing Activities), text, app pages, web page url and in-app messages with animations. The Dynamic-Push® can be provided using the Java, Android Java using Android Studio, Objective-C, and Swift using X-Code iOS Platform on Unix Platform and hosted on Amazon Cloud. The Presentation (UI) tier, Web Admin Dashboard can be provided using Ruby on Rails, AngularJS, jQuery, Bootstrap framework following the HTML 5 and CSS3 standards. The business tier will be instantiated using Ruby gems Library. The data access and connected to MySQL data base, No SQL, Big Data and AWS S3 Web RESTful Services.

In some implementations, dynamically animated icons can be incorporated into an existing application using one or more software development kits SDKs in order to provide interactive dynamic push notification functionality. An SDK can be, for example, a set of software development tools that facilitates the creation of applications or the creation of sub-routines that can be incorporated into an existing application. In some cases, an SDK can include one or more application programming interfaces (APIs) (e.g., sets of routines, protocols, and tools that express a software component in terms of its operations, inputs, outputs, and underlying types). In some cases, an SDK can be provided to a software developer by a third party (e.g., a party who is not directly involved in the development of the existing application). For instance, an advertiser can provide a merchant with an SDK that enables the merchant to add interactive dynamic push notification functionality to the merchant's application.

In some cases, in addition to providing an SDK to a software developer, the third party can also provide the software developer with systems that manage the interactive dynamic push notification features of the application. For example, the third party can provide a server system that allows the software developer to generate icon animations and transmit those animations to one or more user devices running the software developer's application. The server system can also receive information regarding users' interactions with the application, aggregate and analyze the information, and present the information to the software developer for review. This can be beneficial, for example, as it allows the software developer to incorporate interactive dynamic push notification features into his own application without requiring that he also provide his own systems to support and manage those features.

Although a third party, in some cases, can provide systems that support and manage the interactive dynamic push notification features of an application, this need not be the case. For example, in some cases, a third party can provide a software developer with an SDK that enables the software developer to incorporate interactive dynamic push notification features into his application, but does not provide the software developer with a server system to support or manage those features. The software developer can, in these cases, provide his own server system or otherwise acquire a server system independently from the third party to provide this functionality. This allows the software developer to maintain greater control of his application and the information collected from its users. This can particularly beneficial, for example, if the software developer wishes to limit others from accessing potentially sensitive or private data.

In some cases, icon animations can be accompanied by auditory effects. For example, in some cases when a user's device animates an icon, the user's device can also generate a particular sound (e.g., a sound effect, music, speech, and/or other audio). In some cases, this can be used to notify the user that an animation is being played, even if the user is not currently viewing the device. In some cases, the sound can depend on the type of information that is being presented. For example, certain types of sound can be played for certain types of animations, such that the user can differentiate between them.

Although example implementations are described with respect to user devices such as smartphones and tablets, these are merely illustrative examples. In practice, implementations of animated icons can be used with any other type of electronic device, including desktop computer computers, notebook computers, media players, "smart" TVs, digital video recorders (DVRs), virtual reality systems, in-car systems for mobile apps that control a vehicle's dashboard display, intelligent devices that include voice recognition, watches and other wearable intelligent devices (e.g., smart glasses).

Further, although example implementations are described with respect to "icons," an "icon" can, in some cases, encompass any graphical element that represents an application on a user interface, presents information pertaining to the application, or is otherwise associated with the application. For example, in some cases, an icon can include graphical elements such as widgets, images, thumbnails, textual labels, and/or combinations thereof. As described above, any of these graphical elements can be animated as described above in order to present interactive and dynamically changing information to users of electronic devices. Likewise, the user can interact with these any of these graphical elements in order to perform a variety of tasks on their electronic devices.

Some implementations of subject matter and operations described in this specification can be implemented in digital electronic circuitry, or in computer software, firmware, or hardware, including the structures disclosed in this specification and their structural equivalents, or in combinations of one or more of them. Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks , and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The foregoing techniques and features can be used in a wide range of applications. Examples include, but are not limited, to the following:

- Clothing/Shoes Retailers and Wholesalers who want to engage customers with new items, special sales, targeted discounts, and other alerts.
- Software Products and Service Providers who want to engage customers with alerts about upcoming software updates and bug fixes.
- Technology Retailers and Wholesalers who want to engage customers with new items, special sales, targeted discounts, and other alerts such as recalls or product updates.
- Video Game and Computer Game Providers who want to engage customers with new items, special sales, targeted discounts, and other alerts such as software updates and bug fixes.
- Sports Organizations and Venues that Host Live Events who want to engage customers with new events, performances, appearances, special sales, targeted discounts, and other alerts.
- Food Service Providers who want to engage customers with new items, special sales, targeted discounts, and other alerts.
- Banks and Financial Institutions who want to engage customers with account updates, fraud alert, low balance, and other alerts.
- Federal, State, and Local Governments and Government Related Organizations who want to engage civilians with traffic or service updates/announcements, possible threat or emergency alerts, reminders about days for refuse collection and parking rules, and other alerts.
- Weather and Geological Services who want to engage customers with inclement or hazardous weather alerts, safe zone directions, and other alerts.
- Individual Users who want to engage friends, family members, or personal network with personal alerts such as upcoming birthdays or events, personal for "sale" items, personal marketing ventures, and other alerts.
- Gambling sites
- Dating sites
- Music retailers and ticket sales
- Television shopping and Retail
- Auction sites
- Messaging activities
- Social networking activities
- Sports and Fantasy sports Various modifications may be made without departing from the spirit and scope of the disclosure. Accordingly, other implementations are within the scope of the claims.

What is claimed is:

1. A computer-implemented method for controlling dynamic icon displayed on a display screen of a user device, the method comprising:
   displaying, by the display screen, the dynamic icon on a home screen interface of the user device, the home screen interface being operable to display a plurality of additional icons, each additional icon of the plurality of additional icons indicating a different respective application on the user device;
   receiving, by the user device, one or more user selections by a user of the user device, wherein each user selection indicates a respective type of data item to be presented on the user device;
   receiving, by the user device from a server system remote from the user device, one or more data items;
   identifying one or more data items that are associated with the one or more types of data items to be presented on the user device;
   receiving, by the user device, one or more animations from the server system, the one or more animations corresponding to the one or more identified data items;
   presenting the one or more identified data items on the home screen interface by animating, on the home screen interface, one or more display elements depicted in the dynamic icon according to the one or more received animations,
   wherein the one or more identified data items on the home screen interface are presented responsive to a command transmitted by a second device to the server system, the command comprising an instruction to present the one or more identified data items on the home screen interface of the user device;
   determining, by the user device, a number of times that the user has selected the dynamic icon on the display screen, and in response:
   performing, by the user device, an action based on the number of times that the user has selected the dynamic icon.

2. The method of claim 1, wherein determining a number of times that the user has selected the dynamic icon includes determining that the user has selected the dynamic icon once, and in response:
   performing the action including opening a landing page that includes information related to the one or more identified data items.

3. The method of claim 2, wherein determining a number of times that the user has selected the dynamic icon includes determining that the user has selected the dynamic icon twice, and in response:
   performing the action including pausing an animation of the dynamic icon.

4. The method of claim 3, wherein determining a number of times that the user has selected the dynamic icon includes determining that the user has selected the dynamic icon three times, and in response:
   performing the action including displaying a notification setting to allow the user to customize the types of data item to be presented on the user device by the dynamic icon.

5. The method of claim 1, wherein determining a number of times that the user has selected the dynamic icon includes:

determining that the user has selected the dynamic icon once while the dynamic icon is not animated, and in response performing the action including opening a first user interface of an application, and determining that the user has selected the dynamic icon once while the dynamic icon is animated, and in response performing the action including opening a second user interface of the application different from the first user interface, the second user interface including information the one or more identified data items.

6. A system for controlling a dynamic icon displayed on a display screen of a user device, the method comprising:
one or more processors; and
one or more non-transitory computer-readable media including one or more sets of instructions which, when executed by the one or more processors, causes:
displaying, by the display screen, the dynamic icon on a home screen interface of the user device, the home screen interface being operable to display a plurality of additional icons, each additional icon of the plurality of additional icons indicating a different respective application on the user device;
receiving, by the user device, one or more user selections by a user of the user device, wherein each user selection indicates a respective type of data item to be presented on the user device;
receiving, by the user device from a server system remote from the user device, one or more data items;
identifying one or more data items that are associated with the one or more types of data items to be presented on the user device;
receiving, by the user device, one or more animations from the server system, the one or more animations corresponding to the one or more identified data items;
presenting the one or more identified data items on the home screen interface by animating, on the home screen interface, one or more display elements depicted in the dynamic icon according to the one or more received animations,
wherein the one or more identified data items on the home screen interface are presented responsive to a command transmitted by a second device to the server system, the command comprising an instruction to present the one or more identified data items on the home screen interface of the user device;
determining, by the user device, a number of times that the user has selected the dynamic icon on the display screen, and in response:
performing, by the user device, an action based on the number of times that the user has selected the dynamic icon.

7. The system of claim 6, wherein determining a number of times that the user has selected the dynamic icon includes determining that the user has selected the dynamic icon once, and in response:
performing the action including opening a landing page that includes information related to the one or more identified data items.

8. The system of claim 7, wherein determining a number of times that the user has selected the dynamic icon includes determining that the user has selected the dynamic icon twice, and in response:
performing the action including pausing an animation of the dynamic icon.

9. The system of claim 8, wherein determining a number of times that the user has selected the dynamic icon includes determining that the user has selected the dynamic icon three times, and in response:
performing the action including displaying a notification setting to allow the user to customize the types of data item to be presented on the user device by the dynamic icon.

10. The system of claim 6, wherein determining a number of times that the user has selected the dynamic icon includes:
determining that the user has selected the dynamic icon once while the dynamic icon is not animated, and in response performing the action including opening a first user interface of an application, and
determining that the user has selected the dynamic icon once while the dynamic icon is animated, and in response performing the action including opening a second user interface of the application different from the first user interface, the second user interface including information the one or more identified data items.

11. A non-transitory computer-readable medium including one or more sets of instructions which, when executed by one or more processors, causes:
displaying, by a display screen of a user device, a dynamic icon on a home screen interface of the user device, the home screen interface being operable to display a plurality of additional icons, each additional icon of the plurality of additional icons indicating a different respective application on the user device;
receiving, by the user device, one or more user selections by a user of the user device, wherein each user selection indicates a respective type of data item to be presented on the user device;
receiving, by the user device from a server system remote from the user device, one or more data items;
identifying one or more data items that are associated with the one or more types of data items to be presented on the user device;
receiving, by the user device, one or more animations from the server system, the one or more animations corresponding to the one or more identified data items;
presenting the one or more identified data items on the home screen interface by animating, on the home screen interface, one or more display elements depicted in the dynamic icon according to the one or more received animations,
wherein the one or more identified data items on the home screen interface are presented responsive to a command transmitted by a second device to the server system, the command comprising an instruction to present the one or more identified data items on the home screen interface of the user device;
determining, by the user device, a number of times that the user has selected the dynamic icon on the display screen, and in response:
performing, by the user device, an action based on the number of times that the user has selected the dynamic icon.

12. The non-transitory computer-readable medium of claim 11, wherein determining a number of times that the user has selected the dynamic icon includes determining that the user has selected the dynamic icon once, and in response:
performing the action including opening a landing page that includes information related to the one or more identified data items.

13. The non-transitory computer-readable medium of claim 12, wherein determining a number of times that the user has selected the dynamic icon includes determining that the user has selected the dynamic icon twice, and in response:
   performing the action including pausing an animation of the dynamic icon.

14. The non-transitory computer-readable medium of claim 13, wherein determining a number of times that the user has selected the dynamic icon includes determining that the user has selected the dynamic icon three times, and in response:
   performing the action including displaying a notification setting to allow the user to customize the types of data item to be presented on the user device by the dynamic icon.

15. The non-transitory computer-readable medium of claim 11, wherein determining a number of times that the user has selected the dynamic icon includes:
   determining that the user has selected the dynamic icon once while the dynamic icon is not animated, and in response performing the action including opening a first user interface of an application, and
   determining that the user has selected the dynamic icon once while the dynamic icon is animated, and in response performing the action including opening a second user interface of the application different from the first user interface, the second user interface including information the one or more identified data items.

* * * * *